US008379261B2

(12) United States Patent
Ming

(10) Patent No.: US 8,379,261 B2
(45) Date of Patent: Feb. 19, 2013

(54) CREATION AND PLACEMENT OF TWO-DIMENSIONAL BARCODE STAMPS ON PRINTED DOCUMENTS FOR STORING AUTHENTICATION INFORMATION

(75) Inventor: Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 822 days.

(21) Appl. No.: 12/338,945

(22) Filed: Dec. 18, 2008

(65) Prior Publication Data

US 2010/0157318 A1 Jun. 24, 2010

(51) Int. Cl.
*G06F 15/00* (2006.01)

(52) U.S. Cl. ...... 358/1.18; 358/1.1; 358/1.15; 358/3.28; 235/462.01; 235/494

(58) Field of Classification Search ........................ None
See application file for complete search history.

(56) References Cited

U.S. PATENT DOCUMENTS

| | | | | |
|---|---|---|---|---|
| 5,866,895 | A * | 2/1999 | Fukuda et al. | 235/494 |
| 6,483,570 | B1 * | 11/2002 | Slater et al. | 355/40 |
| 7,092,116 | B2 * | 8/2006 | Calaway | 358/1.18 |
| 7,575,168 | B2 * | 8/2009 | Suomela et al. | 235/462.01 |
| 8,081,348 | B2 * | 12/2011 | Hosoda | 358/3.28 |
| 2005/0008261 | A1 * | 1/2005 | Wolff et al. | 382/305 |
| 2006/0027660 | A1 * | 2/2006 | Ming et al. | 235/462.04 |
| 2007/0176001 | A1 | 8/2007 | Cattrone et al. | |
| 2007/0278303 | A1 | 12/2007 | Cattrone | |
| 2008/0000991 | A1 | 1/2008 | Yin et al. | |
| 2008/0002853 | A1 | 1/2008 | Kawabe et al. | |
| 2010/0025472 | A1 | 2/2010 | Morgana et al. | |

* cited by examiner

*Primary Examiner* — Richard Zhu
(74) *Attorney, Agent, or Firm* — Chen Yoshimura LLP

(57) ABSTRACT

A document authenticating method is disclosed by which a plurality of two-dimensional barcode stamps are generated and printed on a back side of the document forming a predefined special pattern. The barcode stamps collectively encode the content of the document to be used for document authentication. Each barcode stamp encodes linking information indicating the position of the next barcode stamp. An index barcode may be printed on the front side of the document which encodes the position information for all of the barcode stamps on the back side.

20 Claims, 1 Drawing Sheet

CREATION AND PLACEMENT OF TWO-DIMENSIONAL BARCODE STAMPS ON PRINTED DOCUMENTS FOR STORING AUTHENTICATION INFORMATION

CROSS REFERENCE TO RELATED APPLICATIONS

This application cross-references and incorporates by reference U.S. patent application Ser. No. 12/341,966, filed Dec. 22, 2008, entitled "Creation and placement of two-dimensional barcode stamps on printed documents for storing authentication information".

BACKGROUND OF THE INVENTION

1. Field of the Invention

This invention relates to the application of two-dimensional barcode in document authentication, and in particular, it relates to the creation and placement of barcode stamps on printed documents.

2. Description of Related Art

Barcode is a form of machine-readable symbology for encoding data, and has been widely introduced in a variety of application fields. Two-dimensional barcode (2d barcode) is one mode of such symbology. It can be used to encode text, numbers, images, and binary data streams in general, and has been used in identification cards, shipping labels, certificates and other documents, etc. Examples of widely used 2d barcode standards include PDF417 standard and QR Code®, and software and hardware products have been available to print and read such 2d barcodes.

Original digital documents, which may include text, graphics, images, etc., are often printed, and the printed hard copy are distributed, copied, etc., and then often scanned back into digital form. This is referred to as a closed-loop process. Authenticating a scanned digital document refers to determining whether the scanned document is an authentic copy of the original digital document, i.e., whether the document has been altered while it was in the hard copy form. Alteration may occur due to deliberate effort or accidental events. Methods have been proposed to authenticate a printed document using 2d barcode. Specifically, the method includes encoding the content of the document in a 2d barcode (the authentication barcode), and printing the barcode on the same recording medium as the printed document. The content of the document may be a bitmap image of a page of the document, text, graphics or images contained within the document, or a mixture thereof. To authenticate a printed document bearing an authentication barcode, the document is scanned to obtain scanned data that represents the content of the document, e.g. a bitmap image, text extracted by using an optical character recognition (OCR) technology, etc. The authentication barcode is also scanned and the data contained therein (the authentication data) is extracted. The scanned data is then compared to the authentication data to determine if any part of the printed document has been altered since it was originally printed, i.e. whether the document is authentic. Some authentication technologies merely determine whether any alterations have occurred, some are able to determine what content has been altered and what the alterations are. A printed document bearing authentication barcode is said to be self-authenticating because no information other than what is on the printed document is required to authenticate its content.

SUMMARY

The present invention is directed to a method and related apparatus for encoding document authentication data in two-dimensional barcode stamps and arranging the barcode stamps in a special pattern on the back side of the printed document.

An object of the present invention is to generate a document with authenticating barcode stamps that has a more appealing appearance and is more secure.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for printing a document, which includes: obtaining a content of the document; obtaining metadata to be encoded in barcode stamps; generating a first plurality of two-dimensional barcode stamps encoding the metadata, the first plurality of barcode stamps being arranged to form a pre-defined pattern, the pre-defined pattern being a non-regular array of barcode stamps; and printing the content of the document and the first plurality of barcode stamps on a recording medium, the first plurality of barcode stamps forming the pre-defined pattern.

The metadata may include authentication data. Each of the first plurality of barcode stamps may encode linking information indicating a position of a next barcode stamp. The content of the document and the first plurality of barcode stamps may be printed on opposite sides of the recording medium.

The authenticating process includes scanning the printed document including the content of the document and the first plurality of barcode stamps and extracting and decoding the metadata encoded in the plurality of barcode stamps.

In another aspect, the present invention provides a computer program product that controls a data processing apparatus to perform the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

To generate a self-authenticating document using 2d barcodes, a relatively large amount of data representing the content of the document must be encoded in the barcodes (referred to as the authentication barcodes). The content of the document may include bitmap images, graphics, and text. The text may originate from the application that created the document, or extracted from images using optical character recognition (OCR) techniques. The size of the barcode stamps may be, for example, 1 cm by 1 cm and the tile size may be, for example, 6 by 6 pixels (dots) at a resolution of 400 dpi. Here, barcode stamps refer to individual blocks each having well defined boundaries and constituting a barcode; tiles refer to the small black (or colored) and white elements arranged in a defined pattern that collectively comprise a barcode stamp. Multiple barcode stamps are typically needed to encode the content of a page of document for authentication purposes. For example, using the stamp size and tile size in the above example, more than forty stamps may be required to encode the content of one typical page of document. Such stamps must be placed in a white area of the document where no document image exists. There is often insufficient white area on the document to print the stamps. It has been proposed to print the stamps on the backside of the document, where the stamps are arranged in a regular array pattern. However, simply arranging barcode stamps in a regular array pattern may generate an unattractive appearance.

Other disadvantage of previous methods of creating and placing authentication barcodes include potential security risk as well as the possible authentication failure due to removal, substitution or other alteration of the barcode stamps.

Embodiments of the present invention provide a document authentication method by which a plurality of barcode stamps are generated and arranged in pre-defined patterns on the printed document. For instance, an alphabetical character (e.g., “K”) can be chosen by a user as the special pattern to express the shape of the chosen character by the barcode stamps. The size and the number of the barcode stamps to be generated can be decided automatically depending on the complexity in terms of the shape of the special pattern. A method is also provided to link the barcode stamps to each other so that alteration of the barcode stamps can be detected.

Figure 1A:
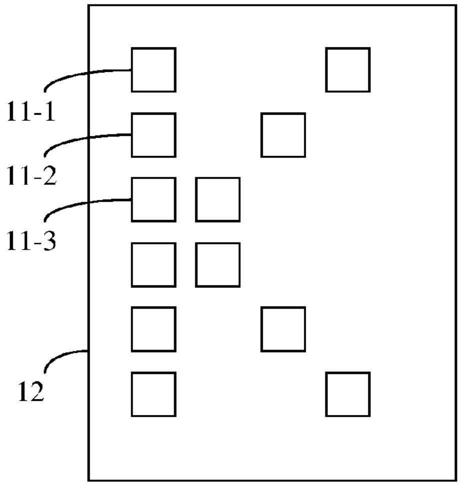
FIG. 1A schematically illustrates a plurality of barcode stamps printed on a back side of printed document forming a special pattern according to an embodiment of the present invention.
Figure 1B:
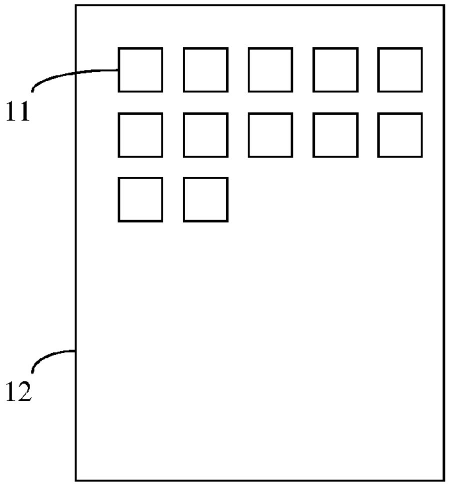
Fig. 1B (Prior art)
FIG. 1B schematically illustrates a plurality of barcode stamps printed on a back side of printed document forming a regular array pattern according to a conventional method.

FIG. 1A schematically illustrates a pattern of barcode stamp arrangements according to an embodiment of the present invention. The barcode stamps 11-1, 11-2, 11-3, etc. in this example are placed on the back side 12 of the printed document. Instead of arranging the barcode stamps 11 in a regular array pattern, as shown in FIG. 1B (prior art), the barcode stamps are arranged to form a pre-defined special pattern as shown in FIG. 1A. The special pattern may be a pre-defined default pattern, or a customized pattern defined by a user. Of course, the pattern shown in FIG. 1A is merely an example, and any desirable patterns may be used.

Further, linking information is embedded in each barcode stamp 11-1, 11-2, etc. to indicate the position of the next barcode stamp. Thus, the first barcode stamp 11-1 includes linking information about the position of the second barcode stamp 11-2, the second barcode stamp 11-2 includes linking information about the position of the third barcode stamp 11-3, etc. The linking information in the last barcode stamp may be a special code to indicate that it is the last stamp. The linking information may also be encoded bi-directionally, i.e., the second barcode stamp 11-2 may additionally include linking information about the position of the first barcode stamp 11-1, the third barcode stamp 11-3 may additionally include linking information about the position of the second barcode stamp 11-2, etc. This additional information can be used to further ensure the authenticity of the barcode. Alternatively or in addition, each of barcode stamps 11-1, 11-2, 11-3, etc. may include link information about the position of the first barcode stamp 11-1, so that the first barcode stamp 11-1 can be found or identified from any one of the barcode stamps 11-1, 11-2, 11-3, etc.

The position of each barcode stamp is measures at a predefined point of the stamp, such as the upper-left hand corner, the center, etc. The position of the next stamp may be a relative position with respect to the current stamp, or an absolute position measured from a common point on the page. The position is two-dimensional, i.e., it includes a horizontal component and a vertical component. The position may be measured by any suitable measures, such as the number of pixels (dots), the number of tile lengths, inches, etc., and the measure may be different for the horizontal and vertical components. In one particular example, the horizontal and vertical relative positions, respectively, are measure by units equal to ¼ of the length and height, respectively, of the barcode stamps.

In addition, an index barcode may be printed on the front of the page and contains the linking information of all of the barcode stamps on the back side. For example, the index stamp contains the relative position of the second stamp from the first stamp, the relative position of the third stamp from the second stamp, etc. Alternatively or in addition, the index stamp may contain information about the shape of a pattern, such as a graphic pattern or the form of an alphabetical character (e.g. “K” in the example of FIG. 1A).

Figure 2:
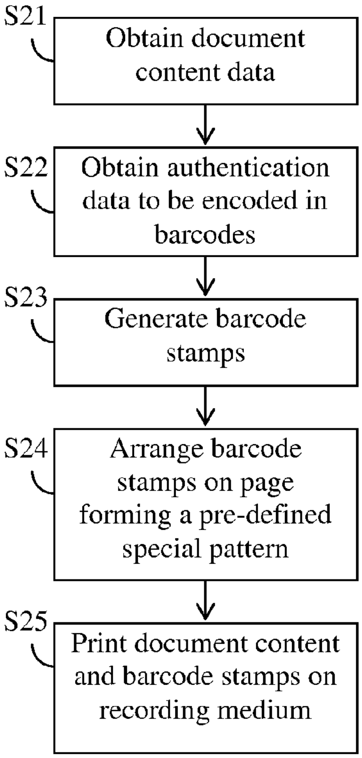
FIG. 2 illustrates a process of generating a printed document bearing barcode stamps for document authentication according to an embodiment of the present invention.

Methods of generating 2d barcode stamps for document authentication is generally known to those skilled in the relevant art. Embodiments of the present invention provide a modified method to form special stamp patterns. The method may be implemented by software in a computer, printer or other data processing apparatus. As shown in FIG. 2, the process first obtains the document content data (step S21). The data may originate from an application program such as a word processing application, a PDF writer application, etc., or from scanning a hard copy of a document. The document content data may be in any appropriate format, such as text, bitmap image, etc. The process then obtains authentication data to be encoded in barcodes (step S22). This step may include processing the document content data to generate the authentication data, such as compressing the document content data, digitally signing the data (optional), and encrypting the data (optional). Compression is optional but is generally desired to reduce data size. Other processing may also be performed on the document content data, such as extracting text data from image data using OCR techniques, down sampling image data to reduce its size, extracting image features using image processing related technology, etc. Alternatively or in addition, step S22 may include obtaining the data to be encoded in barcodes from an independent source, such as the application that created the document.

The authentication data is then encoded to generate a plurality of barcode stamps (step S23). As described earlier, each barcode stamp also encodes linking information indicating the position of the next barcode stamp. The barcode stamps are arranged on the document, such as the back side of the printed page, forming a special pattern (step S24). This step may also include placing an index barcode on the front side of the printed document as described earlier. The document and the barcode stamps are then printed (step S25).

Figure 3:
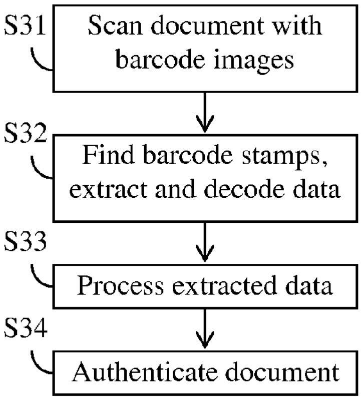
FIG. 3 illustrates a process for scanning a printed document bearing barcode stamps and authenticating the document according to an embodiment of the present invention.

In the authenticating process, shown in FIG. 3, the document is scanned (step S31). The barcode stamps are identified and the data encoded therein is extracted and decoded (step S32). This step includes extracting the linking information from each barcode stamp, and using the linking information to determine the position of the next barcode stamp. This step also includes extracting and decoding the index barcode on the front of the page to verify the authenticity of linking information and/or the shape of the formed pattern by the barcode stamps on the back side, which partially indicates the authenticity of the barcode.

The authentication data decoded from the barcode stamps is processed (step S33), including decryption (optional), digital signature verification (optional), decompression, etc. The processed data is used to authenticate the document (step S34). The process of authenticating a document using extracted data is generally known to those skilled in the relevant art and a more detailed description is omitted here.

Because each barcode stamp encodes linking information indicating the position of the next barcode stamp, if a barcode stamp is missing or altered, the linking information will be lost or become invalid. As a result, the decoding program will be unable to correctly locate and read the next barcode stamp. Thus, a warning message may be generated to indicate that the barcode stamps have been altered and that the authenticity of the document itself may be in question.

Although embodiments of the present invention are described above in the context of document authentication, the invention may be used when barcodes are printed on document for other purposes. For example, barcode stamps may be printed on documents to store metadata about the document, such as filename, author, title, subject, category, keywords, comments, revision number, etc. The data to be encoded in barcodes may be generally referred to as metadata in this disclosure. The invention is especially advantageous when the amount of metadata (such as authentication data) to be encoded in the barcode stamps is large.

It will be apparent to those skilled in the art that various modification and variations can be made in the barcode creation and placement method of the present invention without departing from the spirit or scope of the invention. Thus, it is intended that the present invention cover modifications and variations that come within the scope of the appended claims and their equivalents.

What is claimed is:

1. A method for printing a document, comprising:

obtaining a content of the document;

obtaining metadata about the document to be encoded in barcode stamps, the metadata including at least one of: authentication data, filename, author, title, subject, category, keywords, comments, and revision number;

generating a first plurality of two-dimensional barcode stamps, each of the first plurality of barcode stamps encoding the metadata, each of the first plurality of barcode stamps further encoding linking information which contains a position value of a next one of the first plurality of barcode stamp, the first plurality of barcode stamps being arranged to form a pre-defined pattern, the pre-defined pattern being a non-regular array of barcode stamps; and printing the content of the document and the first plurality of barcode stamps on a recording medium, the first plurality of barcode stamps forming the pre-defined pattern.

2. The method of claim 1, wherein the position is a relative position of the next barcode stamp with respect to the barcode stamp that contains the linking information.

3. The method of claim 1, wherein the content of the document and the first plurality of barcode stamps are printed on opposite sides of the recording medium.

4. A method for printing a document, comprising:

obtaining a content of the document;

obtaining metadata about the document to be encoded in barcode stamps, the metadata including at least one of: authentication data, filename, author, title, subject, category, keywords, comments, and revision number;

generating a first plurality of two-dimensional barcode stamps, each of the first plurality of barcode stamps encoding the metadata, each of the first plurality of barcode stamps further encoding linking information which contains a position value of a next one of the first plurality of barcode stamp, the first plurality of barcode stamps being arranged to form a pre-defined pattern, the pre-defined pattern being a non-regular array of barcode stamps;

printing the content of the document and the first plurality of barcode stamps on a recording medium, the first plurality of barcode stamps forming the pre-defined pattern;

generating an index barcode stamp, the index barcode stamp encoding linking information indicating positions of the first plurality of barcode stamps; and printing the index barcode on the recording medium.

5. The method of claim 4, wherein the content of the document and the first plurality of barcode stamps are printed on opposite sides of the recording medium, and wherein the index barcode is printed on the same side as the content of the document.

6. The method of claim 1, wherein the metadata includes authentication data.

7. The method of claim 1, further comprising:

scanning the printed document including the content of the document and the first plurality of barcode stamps; and extracting and decoding the metadata encoded in the plurality of barcode stamps.

8. The method of claim 7, wherein the extracting and decoding step includes:

decoding one of the barcode stamps to obtain the linking information encoded therein; and decoding a next one of the first plurality of barcode stamps based on the linking information.

9. The method of claim 7, wherein the metadata includes authentication data, the method further comprising authenticating the scanned document using the authentication data.

10. A computer program product comprising a non-transitory computer usable medium having a computer readable code embodied therein for controlling a data processing apparatus, the computer readable program code configured to cause the data processing apparatus to execute a process for printing a document comprising the steps of:

obtaining a content of the document;

obtaining metadata about the document to be encoded in barcode stamps, the metadata including at least one of: authentication data, filename, author, title, subject, category, keywords, comments, and revision number;

generating a first plurality of two-dimensional barcode stamps, each of the first plurality of barcode stamps encoding the metadata, each of the first plurality of barcode stamps further encoding linking information which contains a position value of a next one of the first plurality of barcode stamp, the first plurality of barcode stamps being arranged to form a pre-defined pattern, the pre-defined pattern being a non-regular array of barcode stamps; and printing the content of the document and the first plurality of barcode stamps on a recording medium, the first plurality of barcode stamps forming the pre-defined pattern.

11. The computer program product of claim 10, wherein the position is a relative position of the next barcode stamp with respect to the barcode stamp that contains the linking information.

12. The computer program product of claim 10, wherein the content of the document and the first plurality of barcode stamps are printed on opposite sides of the recording medium.

13. A computer program product comprising a non-transitory computer usable medium having a computer readable code embodied therein for controlling a data processing apparatus, the computer readable program code configured to cause the data processing apparatus to execute a process for printing a document comprising the steps of:

obtaining a content of the document;

obtaining metadata about the document to be encoded in barcode stamps, the metadata including at least one of: authentication data, filename, author, title, subject, category, keywords, comments, and revision number;

generating a first plurality of two-dimensional barcode stamps, each of the first plurality of barcode stamps encoding the metadata, each of the first plurality of barcode stamps further encoding linking information which contains a position value of a next one of the first plurality of barcode stamp, the first plurality of barcode stamps being arranged to form a pre-defined pattern, the pre-defined pattern being a non-regular array of barcode stamps;

printing the content of the document and the first plurality of barcode stamps on a recording medium, the first plurality of barcode stamps forming the pre-defined pattern;

generating an index barcode stamp, the index barcode stamp encoding linking information indicating positions of the first plurality of barcode stamps; and printing the index barcode on the recording medium.

14. The computer program product of claim 13, wherein the content of the document and the first plurality of barcode stamps are printed on opposite sides of the recording medium, and wherein the index barcode is printed on the same side as the content of the document.

15. The computer program product of claim 10, wherein the metadata includes authentication data.

16. The computer program product of claim 10, wherein the process further comprises:

scanning the printed document including the content of the document and the first plurality of barcode stamps; and extracting and decoding the metadata encoded in the plurality of barcode stamps.

17. The computer program product of claim 16, wherein the extracting and decoding step includes:

decoding one of the barcode stamps to obtain the linking information encoded therein; and decoding a next one of the first plurality of barcode stamps based on the linking information.

18. The computer program product of claim 16, wherein the metadata includes authentication data, the method further comprising authenticating the scanned document using the authentication data.

19. The method of claim 4, further comprising:

scanning the printed document including the content of the document, the first plurality of barcode stamps and the index barcode stamp;

decoding the index barcode stamps to obtain the linking information encoded therein; and decoding the metadata encoded in the plurality of barcode stamps based on the linking information.

20. The computer program product of claim 13, wherein the process further comprises:

scanning the printed document including the content of the document, the first plurality of barcode stamps and the index barcode stamp;

decoding the index barcode stamps to obtain the linking information encoded therein; and decoding the metadata encoded in the plurality of barcode stamps based on the linking information.

* * * * *